US007908333B2

(12) United States Patent
Haury

(10) Patent No.: US 7,908,333 B2
(45) Date of Patent: Mar. 15, 2011

(54) SELF CONFIGURING PEER TO PEER INTER PROCESS MESSAGING SYSTEM

(76) Inventor: Harry R. Haury, Chesterfield, MO (US)

( * ) Notice: Subject to any disclaimer, the term of this patent is extended or adjusted under 35 U.S.C. 154(b) by 2086 days.

(21) Appl. No.: 10/614,273

(22) Filed: Jul. 7, 2003

(65) Prior Publication Data

US 2004/0006603 A1    Jan. 8, 2004

Related U.S. Application Data

(63) Continuation-in-part of application No. 10/117,565, filed on Apr. 5, 2002, now Pat. No. 6,604,134, which is a continuation of application No. 09/679,189, filed on Oct. 3, 2000, now Pat. No. 6,408,328, which is a continuation of application No. 08/832,787, filed on Apr. 4, 1997, now Pat. No. 6,128,647.

(60) Provisional application No. 60/014,887, filed on Apr. 5, 1996.

(51) Int. Cl.
*G06F 15/16* (2006.01)
(52) U.S. Cl. ......... 709/207; 709/212; 709/213; 709/223
(58) Field of Classification Search .................. 709/207, 709/212–213, 217–219, 220, 223, 227
See application file for complete search history.

(56) References Cited

U.S. PATENT DOCUMENTS

| 5,428,526 | A |   | 6/1995 | Flood et al. |
| 5,483,535 | A | * | 1/1996 | McMillen et al. ............ 370/452 |
| 5,692,048 | A | * | 11/1997 | Gormish et al. ............. 380/246 |
| 5,748,618 | A | * | 5/1998 | Rothrock ..................... 370/260 |
| 5,768,531 | A | * | 6/1998 | Lin ............................... 709/242 |
| 5,870,563 | A | * | 2/1999 | Roper et al. .................. 709/239 |
| 5,966,531 | A | * | 10/1999 | Skeen et al. .................. 719/315 |
| 5,978,594 | A |   | 11/1999 | Bonnell et al. |
| 6,128,647 | A |   | 10/2000 | Haury |
| 6,185,613 | B1 | * | 2/2001 | Lawson et al. ............... 709/224 |
| 6,408,328 | B1 |   | 6/2002 | Haury |

* cited by examiner

*Primary Examiner* — Faruk Hamza
(74) *Attorney, Agent, or Firm* — Dennis J M Donahue, III; Dennis Donahue & Associates

(57) ABSTRACT

A method for peer-to-peer messaging between network resources is described. The method includes communicating with a first process by writing a first text file in a first scratch space, where the first text file describes at least one of at least a first set of information that a second process has generated and at least a first action to be performed on the first set of information, detecting, by a first arbiter, the first text file, where the first arbiter is implemented by the first process, and performing at least one of implementing, by the first arbiter, the first action, and applying, by the first arbiter, logic embedded within the first arbiter to determine actions to be performed on the first text file.

31 Claims, 5 Drawing Sheets

```
PING MESSAGE
PING
(NODE ID #1)   ORIGINATING NODE
(NODE ID #2)   NODES ADDED
(NODE ID #3)
  ⋮
(NODE ID #n)
```

```
CONTROL MESSAGE
1)  TIME:(00:00:00:00)
2)  DATE: (xx/xx/xx)
3)  RESET:
4)  SILENCE:
5)  KILL:
6)  SHELL:
7)  NEW MASTER: (XXXXXXXXXXXXXX)
8)  SLAVE MASER: (XXXXXXXXXXXXXX)
9)  NET RESET
10) NET DOWN
11) CHANGE ID: (XXXXXXXXXXXXXX)
12) HELLO
13) REQUEST NEW ID
14) MOVE DATA: (XXXXXX.XXX)
15) MOVE PROGRAM: (XXXXXX.XXX)
16) SEND MAP
```

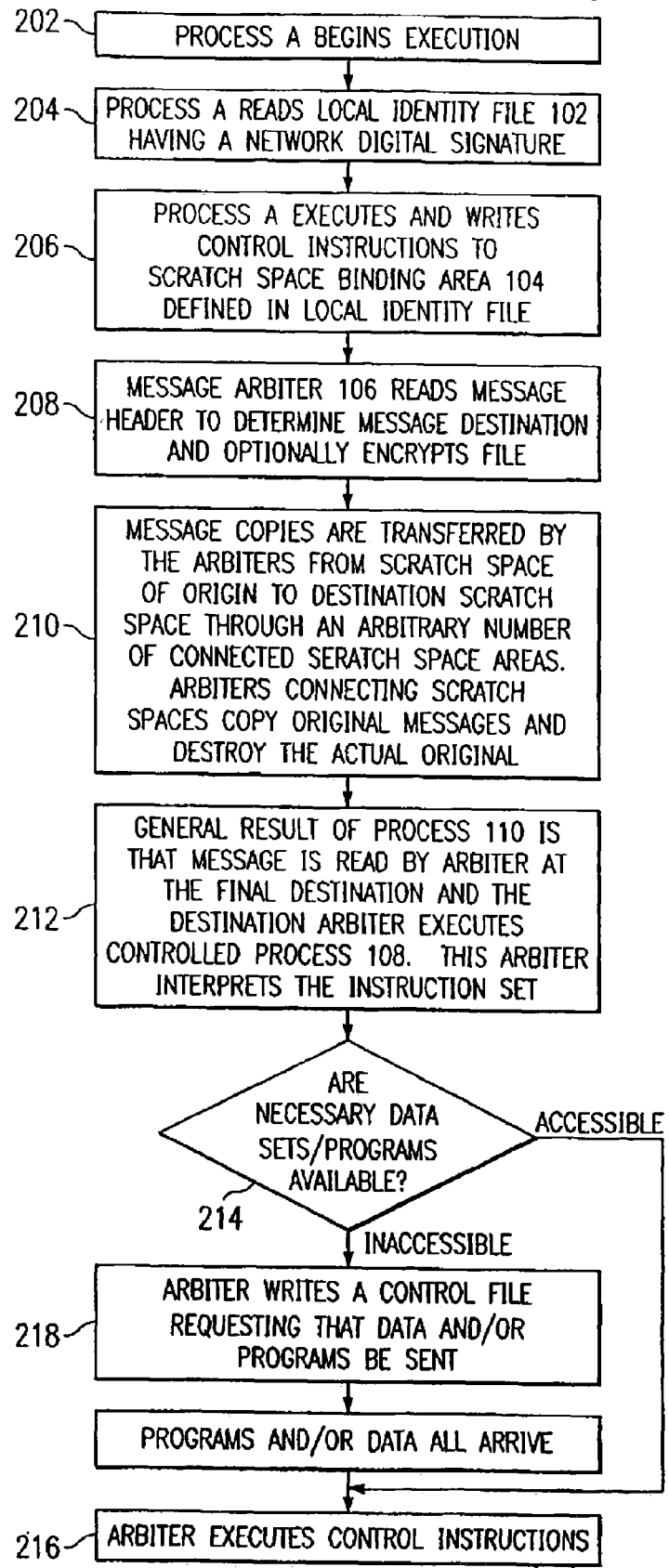

FIG. 3

ALTERNATE MESSAGE STRUCTURES

A  (CONTEXT DEFINED)
FILENAME=PROCESS IDENTIFICATION
FILE EXTENSIONS=CONTROL INSTRUCTION
FILE CONTENTS=DATA SET AND/OR DATA POINTERS

B  (CONTENT DEFINED)
ANY NUMBER OF LINES IN A ARBITRARY ORDER
SOURCE ID: (16 BYTES)
DESTINATION ID: (16 BYTES)
DATA SET: (AN ARBITRARY NUMBER OF BYTES)
PROGRAM: (AN ARBITRARY NUMBER OF BYTES)
SPECIAL INSTRUCTION: (AN ARBITRARY NUMBER OF BYTES); (...);...
KEYBOARD EXECUTION: (AN ARBITRARY NUMBER OF BYTES)
CONFIRMATION REQUEST: (1 BYTE)
RETURN ID: (16 BYTES)
RETURN DATA SET: (AN ARBITRARY NUMBER OF BYTES)
RETURN ENCRYPTION LEVEL: (1 BYTE)
NETWORK CONTROL: (16 BYTES)
DATE: (AN ARBITRARY NUMBER OF BYTES)
TIME: (AN ARBITRARY NUMBER OF BYTES)
SEQUENCE: (16 BYTES)

FIG. 4

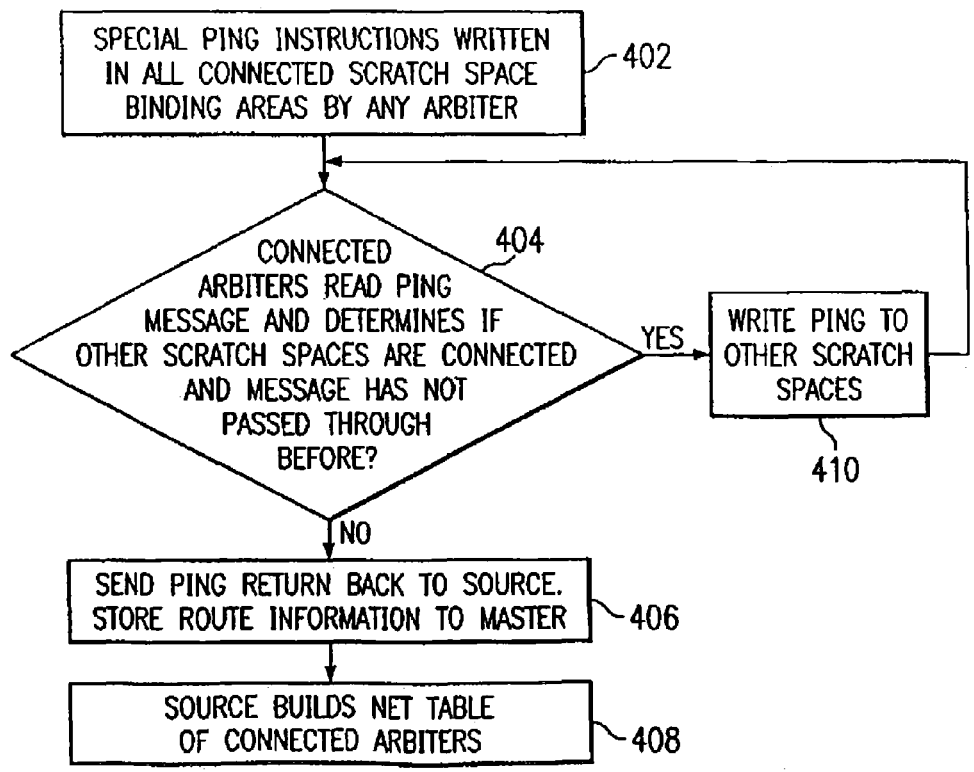

SELF CONFIGURING PEER TO PEER INTER PROCESS MESSAGING SYSTEM

CROSS REFERENCE TO RELATED APPLICATIONS

This application is a continuation-in-part of U.S. Ser. No. 10/117,565, filed Apr. 5, 2002 now U.S. Pat. No. 6,604,134, which is a continuation of U.S. Ser. No. 09/679,189, filed Oct. 3, 2000, now U.S. Pat. No. 6,408,328 B1, which is a continuation of U.S. Ser. No. 08/832,787, filed Apr. 4, 1997, now U.S. Pat. No. 6,128,647, which claims priority based on provisional application Ser. No. 60/014,887, filed Apr. 5, 1996.

BACKGROUND OF THE INVENTION

The traditional limitation of network based inter process messaging and control systems is the incompatibility of the messaging and system control conventions between resources such as various network operating systems and network topologies. With the advent of more ubiquitous networks, significant effort has been expended to enable various operating systems to interact at a basic level by enabling the transfer of data to and from other system environments through the use of compatible data files. The widespread availability of operating system support for data file transfer between incompatible operating environments provides an effective means of automating the transfer of messages and the execution of control instructions between systems that might otherwise be incompatible.

In imaging systems, many vendors have unsuccessfully tried to connect the database directly to the imaging process software across incompatible networks. There is a need for a new operating system independent protocol which does not employ operating system dependent messaging systems such as dynamic data exchange (DDE) or object linking and embedding (OLE) and which operates at a higher level so that the protocol deals directly with the process software.

SUMMARY OF THE INVENTION

It is an object of this invention to provide a system and software which allows peer to peer communication and remote process control between processes operating in incompatible operating environments without the need for a master control program.

It is a further object of this invention to provide a messaging protocol which is available to all processes including incompatible processes and which allows each process to read and write files using the protocol.

It is another object of this invention to define a messaging paradigm which is based on file passing technology and which connects various processes through the creation of files.

It is another object of this invention to provide a simple distributed computer environment (SDCE).

It is another object of this invention to provide a computer system that is compatible with a large variety of systems and applications due to the frequency with which other systems can write and copy the text files. It is another object of this invention to provide a computer system capable of linking incompatible applications and computer systems independent of the computer operating systems being used.

It is another object to provide a system that can move messages and control instructions across an arbitrary number of networks and other connections that allow for the eventual transmission of the messages because of the ease of moving the small american standard code for information exchange (ASCII) instruction files.

It is still another object of this invention to provide a system which is capable of adding new functions to obsolete and otherwise incompatible legacy systems.

It is another object of this invention to provide an interprocess peer to peer messaging system that can connect any number of processes sequentially or in parallel.

It is an object of this invention to provide an interprocess peer to peer system that uses common virtual or physical disk space on any network with file services to connect resources.

It is an object of this invention to provide an interprocess peer to peer system that allows processes to be stacked by the arbiter so that multiple steps can be performed as a single function, such as read routing, package data and instruction file, encrypt file and copy file.

It is an object of this invention to provide an interprocess peer to peer system that allows processes to be stacked as a result of its intrinsic design and as a result of it being able to execute processes by the arbiter.

In one form, the invention comprises a network system comprising a plurality of resources, some of which being incompatible with others, a network interconnecting the resources and an arbiter resident in each of the resources. The arbiter sends messages via the network and receiving messages via the network. Each arbiter independently reviews and processes the messages from other arbiters of other resources so that the resources communicate directly with each other without the need for a master controlling program and without the need for other gateway for controlling and processing the messages as the messages are transmitted between resources.

In another form, the invention comprises a message system for transmitting messages on a network between resources interconnected by the network. An arbiter resident in each of the resources sends messages via the network and receives messages via the network, each said arbiter independently reviewing and processing the messages so that the resources communicate directly with each other. As a result, there is no need for a master controlling program or need for other gateway for controlling and processing the messages as the messages are transmitted between resources.

In another form, the invention comprises an inter process peer to peer messaging system for communicating between a plurality of networked resources, some of which employ operating systems which are incompatible with each other. An arbiter message originator associated with each of the resources provides an arbiter message to be sent to the other resources, the arbiter message instructing one of the other resources to execute one or more of the following: remote program execution, data transport, message communication, status communication and relocation of computer resources. A message arbiter receiver associated with each resource receives the arbiter messages from the other resources and responds to the received arbiter message by executing one or more of the following: retransmitting the arbiter message to another one of the resources; and interpreting and executing the received arbiter message where the arbiter message originator and the arbiter message receiver do the actual communication between their respective resources without the need for a master controlling program and without the need for other gateway for controlling and processing the messages as the messages are transmitted between resources.

In another form, the invention comprises an inter process peer to peer messaging process for communicating between a plurality of networked resources, some of which employ operating systems which are incompatible with each other. The process comprising the steps of: transmitting an arbiter message from one resource to the other resources, the arbiter message instructing one of the other resources to execute one or more of the following: remote program execution, data transport, message communication, status communication and relocation of computer resources; and receiving the arbiter messages from the other resources and for responding to the received arbiter message by executing one or more of the following: retransmitting the arbiter message to another one of the resources; and interpreting and executing the received arbiter message where the actual communication between their respective resources is accomplished without the need for a master controlling program and without the need for other gateway for controlling and processing the messages as the messages are transmitted between resources.

In yet another form, a method for peer-to-peer messaging between network resources includes communicating with a first process by writing a first text file in a first scratch space, where the first text file describes at least one of at least a first set of information that a second process has generated and at least a first action to be performed on the first set of information, detecting, by a first arbiter, the first text file, where the first arbiter is implemented by the first process, and performing at least one of implementing, by the first arbiter, the first action, and applying, by the first arbiter, logic embedded within the first arbiter to determine actions to be performed on the first text file.

In still another form, a method for peer-to-peer messaging between network resources includes reading a text file received within a scratch space to find a digital signature within the text file, comparing the digital signature to the contents of the text file to determine whether the digital signature is valid, moving the text file to a queue designated for improper files on determining that the digital signature is invalid, and processing the text file on determining that the digital signature is valid.

In another form, a method for peer-to-peer messaging between network resources includes reading a text file to find at least one portion of the text file and to find a digital signature within the portion, where the portion is designated for processing, comparing the digital signature to the contents of the portion of the text file to determine whether the digital signature is valid, moving the portion of the text file to a queue designated for improper portions of files on determining that the digital signature is invalid, and processing the portion of the text file on determining that the digital signature is valid.

In yet another form, a method for peer-to-peer messaging between network resources includes obtaining, by a first arbiter, a first output of a first process, parsing information within the first output into a first set of text files, writing the first set of text files into a first text file in at least one of a first scratch space and a second scratch space, detecting, by a second arbiter of a second process, the first text file, reading, by the second arbiter, the first text file, and performing an independent operation on the first text file based on rules in the second arbiter to obtain a second output.

In still another form, a network system includes an originating arbiter configured to communicate with a first process by writing a first text file in a first scratch space, where the first text file describes at least one of at least a first set of information that a second process has generated and at least a first action to be performed on the first set of information, and a first arbiter implemented by the first process. The first arbiter is configured to detect the first text file, and perform at least one of implementation of the first action, and application of logic embedded within the first arbiter to determine actions to be performed on the first text file.

In another form, a network system includes an arbiter configured to read a text file received within a scratch space to find the digital signature within the text file, compare the digital signature to the contents of the text file to determine whether the digital signature is valid, move the text file to a queue designated for improper files on determining that the digital signature is invalid, and process the text file on determining that the digital signature is valid.

In yet another form, a network system includes an arbiter configured to read a text file to find at least one portion of the text file and to find a digital signature within the portion, where the portion is designated for processing, compare the digital signature to the contents of the portion of the text file to determine whether the digital signature is valid, move the portion of the text file to a queue designated for improper portions of files on determining that the digital signature is invalid, and process the portion of the text file on determining that the digital signature is valid.

In still another form, a network system includes a first arbiter configured to obtain a first output of a first process, parse information within the first output into a first set of text files, and write the first set of text files into a first text file in at least one of a first scratch space and a second scratch space. The network system also includes a second arbiter configured to detect the first text file, read the first text file, and perform an independent operation on the first text file based on rules in the second arbiter to obtain a second output.

Other objects and features will be in part apparent and in part pointed out hereinafter.

BRIEF DESCRIPTION OF THE DRAWINGS

FIG. 2 is a flow chart of the logic steps performed by an arbiter of the inter process messaging and control system according to one preferred embodiment of the invention. Appendix A is a Visual Basic source code listing of the arbiter of the invention.

FIG. 3 illustrates the basic content of context defined and content defined messages transferred between different, incompatible applications which are linked by the inter process messaging system according to one preferred embodiment of the invention.

FIG. 4 describes in detail the mechanism used by the master routing arbiter and any other arbiters to dynamically build routing tables in order to determine how to move a control message from one process to another. An example of an arbiter that uses fixed routing to move messages from one scratch space to another is contained in FIG. 4A of Appendix A.

Corresponding reference characters indicate corresponding parts throughout the drawings.

BRIEF DESCRIPTION OF THE APPENDIX

Figures 1, 5, 6:
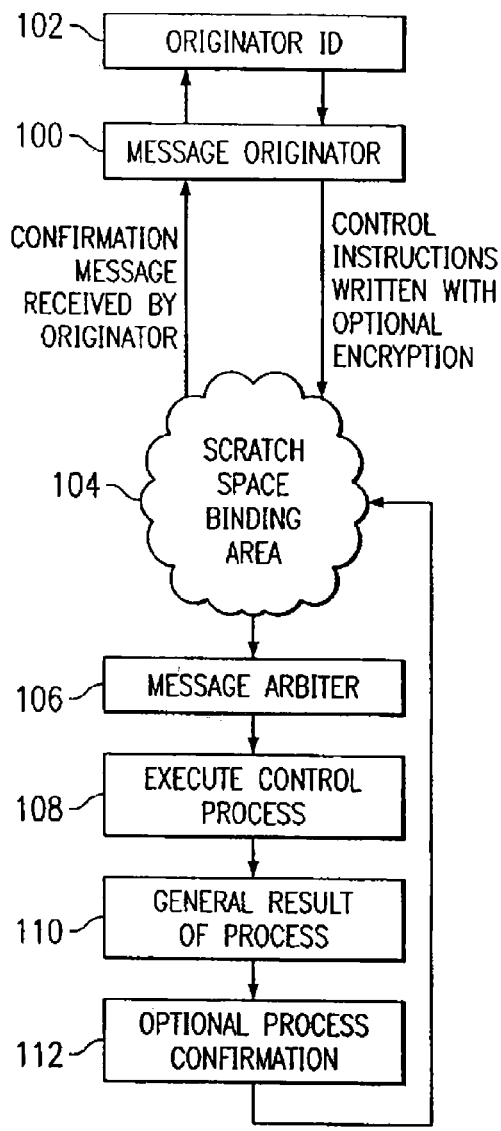
FIG. 1 is a logic diagram of the inter process messaging system according to one preferred embodiment of the invention.
FIG. 5 describes the nature of the Ping message that initially is sent to all locations and is used to establish routing on the network. The Ping message content is fully explained in this figure. After receipt of the Ping message, each arbiter sends out its own unique table identifying itself and the originating resource sending the Ping message takes an inventory of all the arbiters which send out tables in response to the Ping message.
FIG. 6 describes a number of special pre-registered instructions for network commands that are directly executed by the arbiter. Contextual arbiters use fixed pre-registered commands. An example of such an arbiter is contained in FIG. 3A of Appendix A.

Appendix A, FIG. 1A illustrates source code for an identity file.

Appendix A, FIG. 2A illustrates source code for a multi-step communication configuration requiring multiple message files to complete the instruction sequence.

Appendix A, FIG. 3A illustrates source code for implementing an arbiter process based on contextual file content.

Appendix A, FIG. 3B illustrates source code for implementing an arbiter process based on contextual file content.

Appendix A, FIG. 4A illustrates a source code program listing in Visual basic of a message replicating arbiter that uses fixed routing to move messages from one scratch space to another.

DETAILED DESCRIPTION OF THE INVENTION

The system of the invention uses a structured process for object and token passing with an ability to dynamically build network routes between processes resident on different or the same computer, i.e., peer to peer. The processes may be compatible, partially compatible or incompatible. The invention enables the directed transfer of message files from one process to another process without having to have the originating process know the location of another process in a heterogeneous networking environment; the messages are transferred between process names not locations. The use of independent network arbiter agents, one at each resource or group of resources, to copy and interpret control files allows for a very sophisticated remote peer to peer and/or process to process communications and control. The use of a file based message paradigm according to the invention rather than a set of memory or operating system based variables, provides for much greater flexibility to connect otherwise incompatible systems than would be allowed by other network operating system or process specific messaging systems. The simplicity of writing files of the invention also makes it much more convenient to incorporate this interprocess communication and control into a network of separate systems developed in incompatible operating environments. This is due to the ease with which the messages can be copied between the source and target systems. The use of the file based messaging system of the invention also allows obsolete legacy systems to communicate across a system with minimal programming.

The invention comprises means for automatically sending data, messages, and control instructions between processes operating in a single computer or across a complex heterogeneous network environment. The system was designed to write, optionally encrypt, copy, transmit, interpret and execute instructions, and move data based on instructions contained in small, simple to create files. Each process sends messages to an arbiter which has a resource list of all objects which can be executed. Arbiters may be general purpose or have a specific function such as a replicator arbiter or one-sided (end node) arbiter.

In general, an arbiter according to the invention is an independent process which reviews a message including instructions and processes the instructions of the message when the arbiter determines that the message has a token or address which matches the address of the resource with which it is associated or resident. Traditionally, network messaging systems have a master control program (MCP) for controlling messages between resources connected to the network. For example, centralized e-mail would be such a system. All messages passed through the master control program which acts as a gate keeper for maintaining timing, routing and compatibility. Therefore, the master control program is necessary to allow communication between resources. The invention uses arbiters which avoid the need for such intervention by a master control program and essentially avoid the need for a gate keeper. Arbiters communicate with each other by reading and writing the messages to designated scratch spaces.

In general, traditional networks reach a point of difficulty adding additional users or resources because of their complexity and the concentrated loading which occurs as additional users or resources increase. On the other hand, the invention allows the addition of resources without any increase in complexity. An additional resource may be added simply by providing a unique address to it and by having an arbiter which is able to determine or otherwise know its address. All other arbiters would then be advised of the new address of that resource in order to be able to communicate with the resource. In other words, the arbiters of the invention provide a gateway function between resources without the need for intervention of the type that the master control program requires.

The message file from an originating arbiter acts as a token which identifies which process is in control of an arbiter at any particular time. The token also controls permission to read and execute the file. In other words, the message functions as a token that passes control between particular arbiters. First, the destination arbiter verifies that the token is part of a valid message and then the destination arbiter gives this message control by allowing the instructions associated with the token to take exclusive control of the destination arbiter. When a destination arbiter receives a message or token, it temporarily turns its message receiving subsystem off so that it does not receive other conflicting messages or tokens. After completing the analysis and/or execution of a message, the destination arbiter then is ready for the next message. The token is part of a larger message which includes logic embedded therein which instructs the destination arbiter to operate in a particular way and utilize the appropriate resources. In other words, the message is a structured object and can have two forms: contextually defined messages and content messages as illustrated in FIG. 3. Contextually defined messages include content messages but also include inferred instructions interpreted from the message name. The content message includes lines of code which define a particular action and the way to execute it. The message, including a token, may be considered a virtual file. The name of the contextually defined message is essentially the definition of the destination of the message. The extension name defines the action to be taken.

In one preferred embodiment of the invention, the invention may include a multi-step communication configuration requiring multiple message files to complete the instruction sequence. An example can be seen as implemented as part of the source code included herewith. For example, see FIG. 2A, beginning at line 15.

One unique feature of the invention is that it is not specific to a particular operating system but provides a messaging paradigm which can be used with any type of operating system. As a result, the invention may be used to allow a mainframe to communicate with a desktop without the need for a master control program. In general, the system of the invention allows an interface 833 between different, incompatible systems. For example, the invention has been used to allow a mainframe to drive a Windows program on a desktop computer without the need for dynamic data exchange (DDE) or object linking and embedding (OLE) messaging systems, which are specific to the Windows operating system, to be resident in the mainframe.

In one aspect of the invention, the system of the invention may be used to allow imaging between incompatible systems. For example, a Sun computer may scan a document and then provide a message to a PC which can then access the scanned document and print it. Most, if not all systems, can read and write american standard code for information exchange (ASCII) text files, so that it becomes clear that it is easily possible to configure a network of incompatible computers which can access each other's ASCII files by using the arbiter of the invention. Such a system would not require a translator or other master control program which would tend to complicate and slow down the communication between programs.

As noted above and illustrated in FIG. 7, it is also contemplated that encryption may be used so that each message is encrypted to further enhance the security features of the network.

In summary, the invention comprises a network comprising a plurality of resources or applications, some of which being incompatible with others. The network interconnecting the resources. An arbiter resident in each of the resources sends messages as a message originator via the network and receives messages as a message arbiter 106 via the network where each arbiter independently reviews and processes the messages from other arbiters of other resources so that the resources communicate directly with each other without the need for a master controlling program and without the need for other gateway for controlling and processing the messages as the messages are transmitted between resources. The network includes a distributed computing environment interconnecting systems using different operating systems and networking systems and where the arbiter message comprises ASCII text files as illustrated in FIG. 3 for the transmission of instructions between resources. In particular, the arbiter message comprises independent task arbiters 100, 106 operating across the network that can dynamically interact with other task arbiters without the need for a central master control system. The independent task arbiters are independent network agents acting under the sole control of the messages being received. The resources communicate directly with other resources via the independent task arbiters without the intervention of any other process. The independent message arbiters provide asynchronous messaging between resources of the network so that each generated message is transmitted through the network independent of any other messages and the transmitted message will be acted on as it is received by the destination resource. The originating resource executes other tasks after transmitting the message arbiter thereby creating an intrinsically multi-tasking and multi-threaded control system such that multiple arbiter messages can be transmitted through the network independently between multiple resources. The destination arbiter determines whether any necessary data or programs are available for executing the controlled process and writes a control file instructing other network arbiters to transmit the necessary data or programs to the destination arbiter when the destination arbiter determines that the necessary data or programs are not available.

Each arbiter employs messages which may be encrypted so that the network is substantially secure.

The arbiter messages include text interconnecting resources across a network or interconnecting resources within a single computer. Each resource processes the arbiter messages in its background while performing other functions in its foreground. Adding other computer program functions is accomplished by executing arbiter instruction files in the background so that programs that provide additional functions can be executed by other resources that can write the instruction files whereby this execution can be so tightly bound that the executed programs appear to be part of the originating program. Data and software are remotely distributed by directly controlling linked computer systems so that executed programs can do such things as copy files to remote locations. The network may handle time independent instructions and the arbiters may be programmed to execute only at certain times and the programs themselves can be programmed to execute at specific times or intervals by the resources whereby network traffic can be controlled to minimize traffic volume or processor requirements at particular times. The arbiter includes a message replicating arbiter that uses fixed routing to move messages from one scratch space to another.

In another form, the invention comprises a message system for transmitting messages on a network between resources interconnected by the network. An arbiter resident in each of the resources sends messages via the network and receives messages via the network, each said arbiter independently reviewing and processing the messages so that the resources communicate directly with each other. As a result, there is no need for a master controlling program or need for other gateway for controlling and processing the messages as the messages are transmitted between resources.

In another form, the invention comprises an inter process peer to peer messaging system for communicating between a plurality of networked resources, some of which employ operating systems which are incompatible with each other. An arbiter message originator associated with each of the resources provides an arbiter message to be sent to the other resources, the arbiter message instructing one of the other resources to execute one or more of the following: remote program execution, data transport, message communication, status communication and relocation of computer resources. A message arbiter receiver associated with each resource receives the arbiter messages from the other resources and responds to the received arbiter message by executing one or more of the following: retransmitting the arbiter message to another one of the resources; and interpreting and executing the received arbiter message where the arbiter message originator and the arbiter message receiver do the actual communication between their respective resources without the need for a master controlling program and without the need for other gateway for controlling and processing the messages as the messages are transmitted between resources.

In another form, the invention comprises an inter process peer to peer messaging process for communicating between a plurality of networked resources, some of which employ operating systems which are incompatible with each other. The process comprising the steps of: transmitting an arbiter message from one resource to the other resources, the arbiter message instructing one of the other resources to execute one or more of the following: remote program execution, data transport, message communication, status communication and relocation of computer resources; and receiving the arbiter messages from the other resources and for responding to the received arbiter message by executing one or more of the following: retransmitting the arbiter message to another one of the resources; and interpreting and executing the received arbiter message where the actual communication between their respective resources is accomplished without the need for a master controlling program and without the need for other gateway for controlling and processing the messages as the messages are transmitted between resources.

Preferably, the process of the invention includes resources which originate messages of simple ASCII text files and where the resources identify the system identity of messages from the text file. The text files may contain a digital signature such as illustrated at line 12 of Appendix A to prevent unauthorized tampering and/or to verify the message source.

Coding Details

No particular programming language, computer system, or network operating system have been indicated for carrying out the various procedures described above. This is in fact due to the broad applicability of this invention to many computer languages, computer systems and network operating systems. Computers which may be used in practicing the invention are diverse and numerous. It is considered that the operations and procedures described as part of the invention are sufficiently disclosed to permit one of ordinary skill in the art to practice the instant invention. One preferred embodiment of implementation of the invention in Visual Basic source code is found below as Appendix A.

DESCRIPTION OF PREFERRED
EMBODIMENTS ILLUSTRATED IN THE
FIGURES

FIG. 1 shows a diagram that demonstrates the basic logic of the inter process messaging system embodied by the invention. The process originating the message first configures its identity by reading its local identity file. In particular, a resource employs a message originator 100 to read an originator identification (ID) 102. The identity file establishes several defaults for communication, the name of the process, and the location of the scratch space (e.g., RAM disk) to which the process is bound. The originating process writes its message files (described below) which contain its control instructions written with optional encryption in a local storage area that is set in the identity file and is known as a scratch space binding area 104. This area can be used by multiple processes to send messages back and forth. A special process called a message arbiter 106 monitors this scratch space binding area for each new instruction file. When a new file is written, all arbiters monitoring this scratch space read it including a destination arbiter which is identified by the file. After the destination arbiter reads it, the destination arbiter recognizes the file as including the destination arbiter's address or token. As a result, the destination arbiter interprets what should be done and executes the instructions contained within the file. In FIG. 1, message arbiter 106 executes a control process. The instructions may consist of one or more of the following: message replication in at least one other scratch space, execution of instructions, launching of new processes, erasing old message files, or requesting that programs or data be copied so that they may be used or analyzed. The process is inherently asynchronous and, without direct connection between processes, the network of arbiters handle message transmission and instruction execution. However, synchronous type behavior can be programmed into the system by providing for a general result of the process 110 and an optional process confirmation 112 so that execution and error conditions are returned to the original process. An example identity file is contained in FIG. 1A of Appendix A. Code demonstrating the writing of a message file and confirming instruction file as it would be written by a process using the messaging system is demonstrated in FIG. 2A of Appendix A, beginning at line 21.

FIG. 2 describes the logic embedded in the invention to process and interpret these message files. By transferring and executing messages on a peer to peer basis, the invention can be used to distribute data and software, remotely execute programs and procedures, link heterogeneous systems, display images, play multimedia and sound clips, and develop distributed computing applications. Process A is the message originator 100 which may be any external process (e.g., database application or spreadsheet) that will communicate with another external process (control process 108) via the arbiter. Process A begins execution of itself at step 202. At step 204, process A reads its local identity file 102. At step 206, process A writes control instructions for the message arbiter 106 of controlled process 108. These instructions are written to the scratch space binding area 104 defined in the local identity file which is the originator ID 102 of the message originator 100. At step 208, the message arbiter 106 reads the message header in the binding area 104 to determine the controlled process 108 to which the message will be sent. Optionally, the message may be encrypted. At step 210, message copies are transferred by the arbiters from the scratch space of origin to the destination scratch space through an arbitrary number of connected scratch space areas. Arbiters connecting scratch spaces copy original messages and destroy the actual original. At step 212, the arbiter executes the controlled process 108. In particular, the general result of process 110 is that the message is read by the destination arbiter which executes the controlled process. This final destination arbiter interprets the instruction set. The destination arbiter also determines if required data and programs are inaccessible to the destination process. In particular, at step 214, the destination arbiter determines whether the data sets and programs necessary to execute the controlled process are available. If the necessary data sets and programs are available, the destination arbiter proceeds to step 216 and executes the controlled process. If the necessary data sets and programs are not available, the destination arbiter proceeds to step 218 and writes a control file requesting the data and/or programs needed for executing the controlled process. After the data sets or programs arrive at step 220, the destination arbiter proceeds to step 216 and executes the controlled process. In summary, the destination arbiter determines whether any necessary data or programs are available for executing the controlled process and writes a control file instructing other network arbiters to transmit the necessary data or programs to the destination arbiter when the destination arbiter determines that the necessary data or programs are not available.

FIG. 3 describes the basic content of the messages using two different implementations of the invention. Context defined messages (A) are easy to construct and control but they do not have the flexibility and power of the content defined messages (B). The content defined messages (B) must at a minimum have a source ID which identifies the originating process and a destination ID that tells where the message is to be sent. Data set and program lines in the message file identify the data and programs needed to execute the instructions. Special instructions are programs that have been given registered aliases to simplify using them. Keyboard execution provides a means of sending keystrokes to an application that is launched by the arbiter. Confirmation request instructs the destination arbiter to send two messages back to the originating arbiter; message received and a message regarding the success of program execution when the launched programs are finished running.

An example of code implementing an arbiter process based on contextual file content is contained in FIG. 3A of Appendix A, beginning at line 72. FIG. 3A demonstrates the contents of a context defined message file. The destination arbiter is defined by the filename. The controlled process is defined by the file extension. The data sets to be used by the controlled process are defined by file contents.

FIG. 3B also demonstrates the contents of a content defined message file. An example of a code routine implementing an arbiter process based on contextual file content is contained in FIG. 3B of Appendix A, beginning at line 374. This content code routine reads and executes content defined messages and is used as an alternate to the context code routine in FIG. 3A of Appendix A for reading context defined messages. In other words, the content code routine of FIG. 3B of Appendix A executes content based instruction files whereas the context code routine of FIG. 3A of Appendix A executes context based instruction files. The system determines whether the instruction files are content or context based and applies the appropriate routine. The destination arbiter is defined by the filename. The order to the lines in not critical. The line beginning "Source ID:" specifies the identity of the process that originated the message. The line beginning "Destination ID:" specifies the identity of the destination arbiter. Any line(s) beginning "Data Set:" specifies the file(s) that contain the data necessary to execute the controlled process. Any line(s) beginning "Program:" specifies the controlled process program(s) to be executed. Any line(s) beginning "Special Instructions:" specifies any special instructions required for the control process command line. Any line(s) beginning "Keyboard Execution:" specifies redirected key inputs when the arbiter acts as a keyboard robot for the controlled process. A line beginning "Confirmation Request:" specifies whether the controlled process is to send an acknowledgement message of its execution of the message to the controlled process. A line beginning "Return ID:" specifies the identity of a secondary destination arbiter to which the output of the controlled process will be sent. A line beginning "Return Data Set:" specifies the file that will contain the output of the controlled process. A line beginning "Return Encryption Level:" specifies the type of security to be implemented in the return message, if any. A line beginning "Network Control:" specifies one or more of the following: the public key of the arbiter or process originating the message; the type of security implemented by the originating arbiter or program; and/or miscellaneous header information. The Date and Time lines specify date and time of the original message. The line beginning with "Sequence Number:" specifies an arbitrary index identifying the order in which messages were originated by a specific process or arbiter so multiple messages can be sent by a particular process or arbiter to another process or arbiter without ambiguity of order.

FIG. 4 describes in detail the mechanism used by a routing arbiter and any other arbiter to dynamically build routing tables in order to determine how an originating arbiter moves a control message from an originating process through various routing arbiters to a destination arbiter associated with the destination process. An example of an arbiter that uses fixed routing to move messages from one scratch space to another is contained in FIG. 4A of Appendix A, beginning at line 626. Initially, at step 402, special ping instructions are written in all connected scratch space binding areas 104 by the routing arbiter. Decision block 404 represents a step or series of steps to confirm that all connected arbiters have read the ping message. These steps also determine if other scratch spaces are connected. If spaces are identified through which the ping message has not passed through before, the process proceeds to step 406 where the ping message is written to the other scratch spaces. The process then returns to decision block 402. If no spaces are identified so that all have received the ping message, the process proceeds to step 408 where a ping return message is sent back to the routing arbiter by the receiving arbiter and the receiving arbiter stores the route information to its master file. Finally, at step 410, the routing arbiter or source builds net tables of connected arbiters to continue with the actual transfer of instruction files.

FIG. 5 describes the nature of the Ping message that is used to establish routing on the network as described in FIG. 4. The Ping message content is fully explained in this figure.

FIG. 6 describes a number of special pre-registered instructions for network commands that are directly executed by the arbiter. Contextual arbiters use fixed pre-registered commands. An example of such an arbiter is contained in FIG. 3A of Appendix A, beginning at line 72.

There are five layers of message encryption used to protect network security: 1) none; 2) message check digits using originating process digital signature (DS); 3) encryption of whole message using destination ID and originating process; 4) encryption of instructions using destination ID and originating process; and 5) encryption based on destination public key. Optionally, the message can be left as unencrypted ASCII; the message can be given a set of check digits using the originators identity as an encryption key; the message can be encrypted using the network digital signature (DS); the body of the message can be encrypted using the destination's digital signature and the originator's digital signature; and the message can be encrypted using only the destinations public key. The encryption processes are arbitrary in nature and can use such techniques as digital signature, public and private key encryption. An example of these algorithms would be the licensed Rivest-Shamir-Adleman (RSA) encryption techniques.

Figure 7:
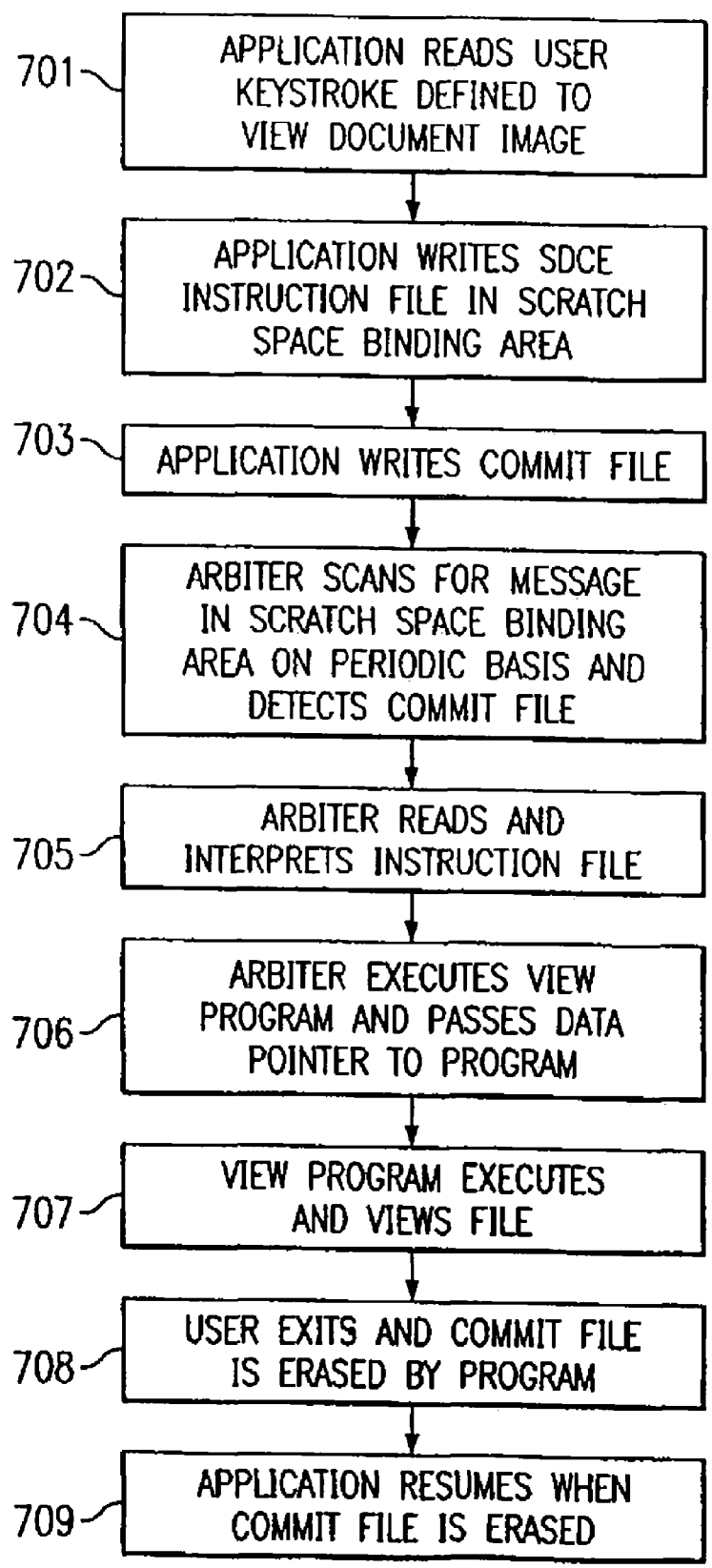
FIG. 7 is a functional block diagram illustrating an image enabling process according to the invention on a stand alone personal computer using a context defined simplified distributed computing environment (SDCE) and a local arbiter.

FIG. 7 is a functional block diagram illustrating an image enabling process according to the invention on a stand alone personal computer using a context defined simplified distributed computing environment (SDCE) message and a local arbiter. In general, FIG. 7 illustrates the use of a text file via an arbiter to control a process such as imaging or file viewing. The application may be any application such as a database program running on the personal computer. At step 701, the application reads a user keystroke which has been defined to execute the function of viewing a document image. At step 702, the application writes an SDCE instruction file to the scratch space binding area 104. The instruction file is a text file including instruction data such as the file identifier of the file to be imaged. In this case, the instruction sequence also includes a commit file which instructs the arbiter to start the controlled process. At step 703, the application writes the commit file. These first three steps are executed by the application.

The next three steps are executed by the arbiter of the stand alone PC which functions as both the originating arbiter and the destination arbiter in a stand alone system. At step 704, the arbiter scans for a message in the scratch space binding area on a periodic basis and detects the commit file written by step 703. Next, at step 705, the arbiter reads and interprets the instruction file associated with the detected commit file. At step 706, the arbiter executes a view program routine, (the controlled process) in response to the detected instructions and passes a data pointer which is part of the instruction file to the view program routine. At step 707, the controlled process, i.e., the view program routine, executes and views the file. At step 708, the user exits and the commit file is erased by the program. At step 709, the application resumes as a result of the commit file being erased.

Figure 8:
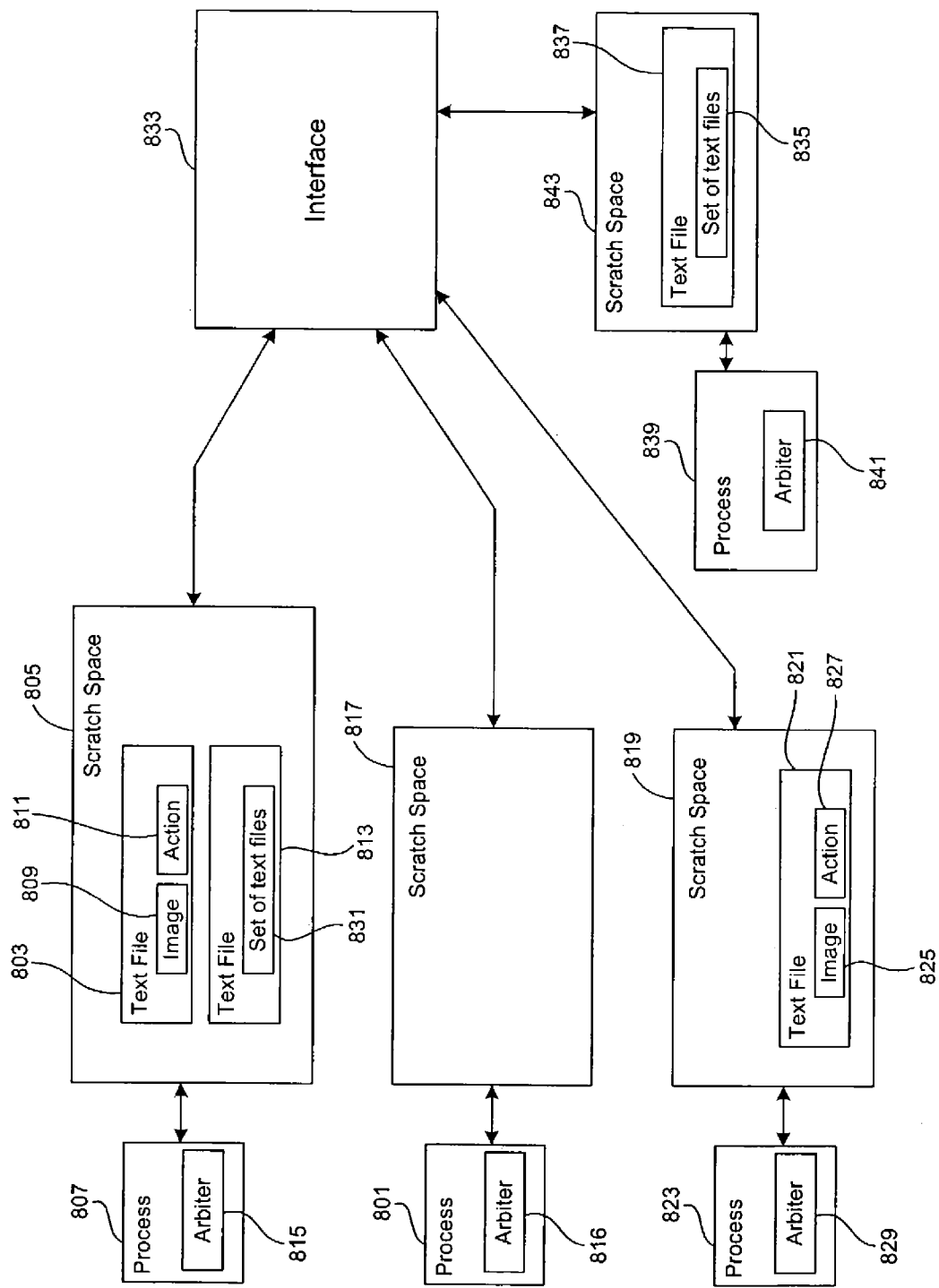
FIG. 8 is a functional block diagram illustrating a system for peer-to-peer messaging between network resources.

FIG. 8 is a functional block diagram illustrating a system for peer-to-peer messaging between network resources. The system includes processes 801, 807, and 823, and 839, arbiters 815, 816, 829, and 841, scratch spaces 805, 817, 819, and 843, an interface 833, text files 803, 813, 821, and 837, images 809, and 825, actions 811 and 827, and sets of text files 831 and 835. Arbiters 815, 816, 829, and 841 may reside within their respective processes or may reside outside their respective processes. An example of process 807 includes an image display process and an example of process 801 includes a scanning process. Other examples of processes 801, 807, 823, and 839 include Microsoft Word™, Microsoft Excel™, Microsoft Photoeditor™, Microsoft Outlook™, Microsoft Powerpoint™, Pine™, Internet Explorer™, and Netscape™. Examples of text files include an ASCII file and examples of structured ASCII files include a hypertext markup language (HTML) file, an extensible HTML (XML) file, a multipurpose internet mail extensions (MIME) file, a NET file, and a simple object access protocol (SOAP) file. In an alternative embodiment, processes 801, 807, and 823, and 839 communicate with each other via interface 833 and a network, such as, internet or intranet.

An arbiter, such as, for instance, the originating arbiter, communicates with process 807 by writing text file 803 in scratch space 805. Text file 803 describes image 809 that process 801 has generated and describes action 811 to be performed on image 803. Image 809 is encoded within text file 803. Alternatively, text file 803 refers to image 809 as being in an external file. In an alternative embodiment, text file 803 describes any information, such as, for instance, information within a Microsoft Powerpoint™ document, a Microsoft Word™ document, a Pine™ document, or a Microsoft Outlook™ document, which process 801 has generated. Action 811 to be performed on image 809 is described in instructions within text file 803.

A user enables an input, such as a keyboard input or a mouse input. The input is written to text file 803 or text file 813 in scratch space 805. Text files 803 and 813 have a type and structure that is designated by the user. Arbiter 815 that is implemented by process 807 detects text file 803, reads the instructions within text file 803, and implements action 811 to generate an output. An example of the output is image 825 that is displayed by the image display process. Alternatively, instead of implementing action 811, arbiter 815 applies its logic to determine actions to be performed on text file 803. The actions are performed on text file 803 to generate the output. The logic is applied to move text file 803 to a second scratch space, to move image 809 to scratch space 817, to determine whether data that is referenced by text file 803 as being in text file 813 should be processed, or to obtain index information from text file 803 and move images associated with the index information into a storage repository.

Process 807 communicates with process 823 by writing text file 821 in scratch space 819. Text file 821 includes image 825 that process 807 has displayed and action 827 to be performed on image 825. Arbiter 829 that is implemented by process 823 detects text file 821. Arbiter 829 implements action 827. In an alternative embodiment, instead of implementing action 827, arbiter 816 applies its own logic to determine actions to be performed on text file 821.

In an alternative embodiment, arbiter 815 reads text file 803 received within scratch space 805 to find a digital signature within text file 803. Arbiter 815 determines whether the digital signature is valid. Arbiter 815 determines whether the digital signature is valid by comparing the digital signature to the contents of text file 803. On determining that the digital signature is invalid, arbiter 815 moves text file 803 to a queue designated for improper files. On determining that the digital signature is valid, arbiter 815 processes text file 803. Text file 803 is processed according to an independent rule set of arbiter 815. In an alternative embodiment, text file 803 is processed by arbiter 815 according to instructions within text file 803. Alternatively, on determining that the digital signature is valid, arbiter 815 compares the digital signature with a list of signatures that are stored in a database (not shown) to which arbiter 815 has access. If there is a match between the digital signature within text file 803 and a digital signature within the list, arbiter 815 sends text file 803 to scratch space 817, scratch space 819, or scratch space 843. Otherwise, arbiter 815 does not send text file 803 to any of scratch spaces 817, 819, and 843

In yet another alternative embodiment, arbiter 815 requests a public key from an authority, such as a certification authority (CA). CA is an entity responsible for establishing and vouching for the authenticity of public keys belonging to subjects, such as users or computers, or other certification authorities. Activities of CA can include binding public keys to distinguished names through signed certificates, managing certificate serial numbers, and certificate revocation. On receiving the public key from the CA, arbiter 815 encrypts a portion of text file 803 by using the public key. Alternatively, on receiving the public key, arbiter 815 encrypts multiple portions of text file 803 or all of text file 803 by using the public key. Arbiter 815 attaches a digital signature to the portion. The digital signature is provided by a user of a controller in which arbiter 815 is implemented. Arbiter 815 transmits the portion and the public key to scratch space 817. On receiving the portion and the public key, arbiter 815 requests an authentication of itself. Alternatively, on receiving the portion and the public key, arbiter 815 requests an authentication of process 801, a controller in which process 801 is implemented, or a user that operates the controller in which process 801 is implemented. Arbiter 815 requests the authentication from the CA by sending the public key to the CA. Arbiter 815 also requests an authentication of the digital signature from the CA. On receiving the authentication of process 801 and the digital signature, arbiter transmits the portion from scratch space 817 to a service. The service decrypts the portion using a private key that corresponds to the public key and sends the decrypted portion to scratch space 817.

In yet another alternative embodiment, arbiter 815 reads text file 803 to find one or more portions that are designated for processing. Arbiter 815 reads text file 803 to find a digital signature within a portion of text file 803. Alternatively, arbiter 815 reads text file 803 to find additional digital signatures within other portions of text file 803. Each portion of text file 803 has a separate digital signature than any other portion of text file 803. Arbiter 815 determines whether the digital signature within the portion is valid. The determination is made by comparing the digital signature within the portion to the contents of the portion. On determining that the digital signature is invalid, arbiter 815 moves the portion of text file 803 to a queue designated for improper portions of files. On determining that the digital signature is valid, arbiter 815 processes the portion of text file 803. The portion is processed according to an independent rule set of arbiter 815. In an alternative embodiment, the portion is processed according to instructions within the portion of text file 803. Alternatively, on determining that the digital signature is valid, arbiter 815 compares the digital signature with a list of signatures that are stored in a database (not shown) to which arbiter 815 has access. If there is a match between the digital signature within text file 803 and a digital signature within the list, the arbiter 815 sends the portion of text file 803 to scratch space 817, scratch space 819, or scratch space 843. Otherwise, arbiter 815 does not send the portion of text file 803 to any of scratch spaces 817, 819, and 843

In still another alternative embodiment, arbiter 815 obtains an output, such as, a document, of process 807, such as Microsoft Word™. Arbiter 815 parses information within the output into a first set of text files and writes at least one file of set of text files 831 into text file 813 in scratch space 805. As an example, a file that is written in text file 813 includes an image, such as, for instance, an image of a check. Arbiter 815 formats the information. Alternatively, arbiter 815 may not format the information.

Arbiter 815 sends text file 813 to process 801 via interface 833. Arbiter 816 detects text file 813, reads text file 813, and performs an independent operation on text file 813 based on rules in arbiter 816 to obtain an output. An example of the output obtained by performing the independent operation is an image file, such as, for instance, a file having an image of a check. Arbiter 816 performs the independent operation by obtaining information from external databases, obtaining information from external data files, or executing external objects. External databases are databases that are located at a network resource other than the one in which arbiter 816 is located, external data files are data files that are located at a network resource other than the one in which arbiter 816 is located, and external objects are objects that are located at a network resource other than the one in which arbiter 816 is located.

Arbiter 816 writes the output obtained by performing the independent operation to scratch space 817. In an alternative embodiment, the output obtained by performing the independent operation is written to scratch spaces other than scratch space 817, such as, for instance, scratch space 819. Arbiter 829 obtains the output generated by the independent operation and parses the information into a set of text files 835. Arbiter 829 writes one or more files of the second set into text file 837 in scratch space 843 of arbiter 841. Arbiter 841 detects text file 837, reads text file 837, and performs an independent operation on text file 837 based on rules in arbiter 841 to obtain an output. Hence, by executing a process similar to the process executed by arbiters 815, 816, 829, and 841, a network of arbiters combine their ability to communicate through scratch spaces by using their own logic or following instructions within a text file in their scratch space binding area. The network of arbiters combine their ability to communicate to determine what to produce as outputs, when and where to produce the outputs.

It is noted that format of text files 803, 813, 821, and 837 is changed to accommodate the way that the text files are used within a network of arbiters 815, 816, 829, and 841. Examples of the format include a plain text format, an HTML format, a SOAP format, and a NET format. As yet another example, the format of text files 803, 813, 821, and 837 is changed by restructuring data within the respective text files. Alternatively, the format of text files 803, 813, 821, and 837 is changed to a format that is specified by any one of arbiters 815, 816, 829, and 841 that receives one of the text files. It is also noted that a network protocol is applied to text files 803, 813, 821, and 837 to move the files between network resources. Examples of network protocols include a file transfer protocol (FTP), HTTP, and a file services network protocol. The method of movement of text files 803, 813, 821, and 837 in the network is not prescribed and anticipates using native machines, operating systems, and the networking protocols available to arbiters 815, 816, 829, and 841 of the network.

In view of the above, it will be seen that the several objects of the invention are achieved and other advantageous results attained. While the invention has been described in terms of various specific embodiments, those skilled in the art will recognize that the invention can be practiced with modification within the spirit and scope of the claims.

What is claimed is:

1. A method for peer-to-peer messaging between network resources comprising:
communicating with a first process by writing a first text file in a first scratch space, where the first text file describes at least one of a first set of information that a second process has generated and a first action to be performed on the first set of information;
detecting, by a first arbiter, the first text file, wherein the first arbiter is implemented by the first process;
performing at least one of:
implementing, by the first arbiter, the first action, and
applying, by the first arbiter, logic embedded within the first arbiter to determine actions to be performed on the first text file:
communicating with a third process independently from a central master control system by writing a second text file in a second scratch space, wherein the second text file describes at least one of a second set of information that the first process has displayed and a second action to be performed on the second set of information:
detecting, by a second arbiter, the second text file, wherein the second arbiter is implemented by the third process; and
performing at least one of:
implementing, by the second arbiter, the second action, and
applying, by the second arbiter, logic embedded within the second arbiter to determine actions to be performed on the second text file.

2. A method in accordance with claim 1 wherein communicating with the first process comprises communicating with the first process by writing an American standard code for information exchange (ASCII) file, and wherein the first arbiter reviews the first text file and upon determining that the first text file includes a match with the first process, performs at least one of the implementing and applying steps.

3. A method in accordance with claim 2 wherein communicating with the first process by writing the ASCII file comprises communicating with the first process by writing one of a hypertext markup language (HTML) file, an extensible HTML (XML) file, a multipurpose internet mail extensions (MIME) file, a .NET file, and a simple object access protocol (SOAP) file in the first scratch space.

4. A method in accordance with claim 1 wherein applying, by the first arbiter, logic embedded within the first arbiter comprises at least one of: moving the first text file to a second scratch space; moving the first set of information to the second scratch space; and obtaining index information from the first text file and moving images associated with the index information into a storage repository.

5. A method in accordance with claim 1 further comprising encoding the first set of information within the first text file.

6. A method in accordance with claim 1 further comprising referencing the first set of information as being in an external file.

7. A method in accordance with claim 1 further comprising: enabling, by the first process, an input from a user; and writing the input to at least one of the first text file and a second text file in the first scratch space.

8. A method in accordance with claim 1 wherein communicating with the first process comprises communicating with an image display process by writing the first text file in the first scratch space.

9. A method in accordance with claim 1 wherein communicating with the first process comprises communicating with the first process by writing the first text file in the first scratch space, wherein the first text file describes at least one of an image that a scanning process has generated and the first action to be performed on the image.

10. A method in accordance with claim 1 further comprising: reading, by the first arbiter, instructions within the first text file.

11. A method in accordance with claim 1 wherein applying, by the first arbiter, logic embedded within the first arbiter comprises determining whether data that is referenced by the first text file as being in a second text file should be processed.

12. A method in accordance with claim 1, wherein said processes are selected from the group consisting of an image scanning process, an image display process, an image editing process, a word editing process, a spreadsheet process, an e-mail process, a calendar process, a contact management process, a database process, a web browser process and any combination thereof.

13. A method in accordance with claim 1 further comprising: specifying a format of the first text file; and changing the format of the first text file to the specified format.

14. A method in accordance with claim 13 where changing the format of the first text file includes one of: converting the first text file from a plain text file to a hypertext markup language (HTML) file; and converting the first text file from a simple object access protocol (SOAP) to a NET file; and restructuring data within the first text file.

15. A method in accordance with claim 1 further comprising: requesting a public key from an authority; encrypting a portion of the first text file by using the public key; signing the portion; transmitting the portion and the public key to a second scratch space; and requesting an authentication of a second process that received the portion and the public key.

16. A method in accordance with claim 15 further comprising: reading the first text file received within the first scratch space to find a digital signature; requesting an authentication of the digital signature; further transmitting the portion from the second process to a service on obtaining the authentication of the second signature; decrypting the portion using a private key; and sending the decrypted portion from the service to the second process.

17. A method in accordance with claim 1 further comprising applying, by the first arbiter, at least one of a File Transfer Protocol (FTP), a Hypertext Transfer Protocol (HTTP), and a file services network protocol to move the first text file between network resources.

18. A method in accordance with claim 1, wherein said first text file drives the first process on a first computer having a first operating system and wherein said second process is on a second computer having a second operating system without messaging systems of said first operating system being resident on said second operating system.

19. A method for peer-to-peer messaging between network resources comprising:
communicating with a first process by writing a first text file in a first scratch space, where the first text file describes at least one of a first set of information that a second process has generated and a first action to be performed on the first set of information, wherein said first text file drives the first process on a first computer having a first operating system and wherein said second process is on a second computer having a second operating system without messaging systems of said first operating system being resident on said second operating system;
detecting, by a first arbiter, the first text file, wherein the first arbiter is implemented by the first process; and
performing at least one of:
implementing, by the first arbiter, the first action, and
applying, by the first arbiter, logic embedded within the first arbiter to determine actions to be performed on the first text file.

20. A method in accordance with claim 19, wherein said detecting step is performed independently from a master control system and wherein said first arbiter performs at least one of said implementing and applying steps in an asynchronous manner relative to a second arbiter associated with the second process.

21. A method for peer-to-peer messaging between network resources comprising:
communicating with a first process by writing a first text file in a first scratch space, where the first text file describes at least one of a first set of information that a second process has generated and a first action to be performed on the first set of information that the second process has generated;
detecting, by a first arbiter, the first text file, wherein the first arbiter is implemented by the first process independently from a master control system; and
determining, by the first arbiter independently from a master control system, that the first text file includes a match with the first process, and performing at least one of:
implementing, by the first arbiter independently from a master control system, the first action, and
applying, by the first arbiter independently from a master control system, logic embedded within the first arbiter to determine actions to be performed on the first text file.

22. A method in accordance with claim 21 wherein said first text file drives the first process on a first computer having a first operating system and wherein said second process is on a second computer having a second operating system without messaging systems of said first operating system being resident on said second operating system.

23. A method in accordance with claim 21 wherein said processes are selected from the group consisting of an image scanning process, an image display process, an image editing process, a word editing process, a spreadsheet process, an e-mail process, a calendar process, a contact management process, a database process, a web browser process and any combination thereof.

24. A method in accordance with claim 21 wherein applying, by the first arbiter, logic embedded within the first arbiter comprises at least one of: moving the first text file to a second scratch space; moving the first set of information to the second scratch space; and obtaining index information from the first text file and moving images associated with the index information into a storage repository.

25. A method in accordance with claim 21 further comprising determining, by the first arbiter independently from a central master control system, whether the first text file contains at least one of a token and an address matching a network resource with which the first arbiter is associated or resident, and moving the first text file between network resources by the first arbiter.

26. A method for peer-to-peer messaging between network resources comprising:
   communicating with a first process by writing a first text file in a first scratch space, where the first text file describes at least one of a first set of information that a second process has generated and a first action to be performed on the first set of information that the second process has generated;
   detecting, by a first arbiter, the first text file, wherein the first arbiter is implemented by the first process; and
   performing at least one of:
      implementing, by the first arbiter and independently from a central master control system, the first action; and
      applying, by the first arbiter and independently from a central master control system, logic embedded within the first arbiter to determine actions to be performed on the first text file.

27. A method in accordance with claim 26 wherein the first arbiter reviews the first text file and upon determining that the first text file includes a match with the first process, performs at least one of the implementing and applying steps.

28. A method in accordance with claim 26 wherein said first text file drives the first process on a first computer having a first operating system and wherein said second process is on a second computer having a second operating system without messaging systems of said first operating system being resident on said second operating system.

29. A method in accordance with claim 26 wherein applying, by the first arbiter, logic embedded within the first arbiter comprises at least one of: moving the first text file to a second scratch space; moving the first set of information to the second scratch space; and obtaining index information from the first text file and moving images associated with the index information into a storage repository.

30. A method in accordance with claim 26 further comprising moving the first text file between network resources by the first arbiter.

31. A method in accordance with claim 26, wherein said first arbiter performs at least one of said implementing and applying steps in an asynchronous manner relative to a second arbiter associated with the second process.

* * * * *